United States Patent [19]

Pierini et al.

[11] Patent Number: 4,844,578

[45] Date of Patent: Jul. 4, 1989

[54] JACKETED POLYMER OPTICAL WAVEGUIDES

[75] Inventors: Peter E. Pierini, Berkeley, Calif.; Thomas M. McCormack, Baton Rouge, La.; David R. Pedersen, Clayton, Calif.

[73] Assignee: The Dow Chemical Company, Midland, Mich.

[21] Appl. No.: 196,587

[22] Filed: May 3, 1988

[51] Int. Cl.$^4$ .............................. G02B 6/00
[52] U.S. Cl. .............................. 350/96.34
[58] Field of Search ............... 350/96.29, 96.30, 96.34

[56] References Cited

U.S. PATENT DOCUMENTS 3,646,186  2/1972  Hager ........................ 264/174

Primary Examiner—William L. Sikes
Assistant Examiner—Robert E. Wise
Attorney, Agent, or Firm—Norman L. Sims

[57] ABSTRACT

The invention is a jacketed polymer optical fiber which comprises: an optical fiber which comprises a core formed from a light transmitting polymeric material having a first refractive index and a cladding formed from a polymeric material having a second refractive index which is lower than the first refractive index; and a jacket about the optical fiber wherein the jacket comprises a chlorinated polyethylene. The jacketed fibers of this invention have a higher service temperature than polyethylene jacketed fibers. The jacketed polymer optical waveguides of this invention are jacketed under conditions such that the optical properties of the polymer optical waveguide are not substantially degraded. The jacketed polymer optical waveguides have relatively low brittleness at use temperatures, good rigidity, and good solvent resistance. They also contain no material which tend to migrate into the polymer optical waveguide.

7 Claims, No Drawings

JACKETED POLYMER OPTICAL WAVEGUIDES

BACKGROUND OF INVENTION

This invention relates to jacketed polymer optical waveguides, more particularly, polymer optical waveguides jacketed with chlorinated polyethylene or compositions containing chlorinated polyethylene.

Polymer optical waveguides comprise a light-transmitting, polymeric core material and a cladding around the core formed from a second polymer having a lower refractive index than that of the core material, said cladding being designed to prevent the light waves from exiting the waveguide by bouncing the light waves back toward the center of the waveguide core.

Polymer optical waveguides are used to transmit light for various functions. The waveguides may be used as part of a sensor for a particular phenomena or material. Alternatively, the polymer optical waveguides may be used to transmit information by discrete light pulses. In some embodiments the polymer optical waveguides are used as cables connecting various information transmitting and receiving machines, for example, computers, telephones, and the like. It is desirable to protect the polymer optical waveguides from certain environments to which the waveguides are exposed. One way to do such is to jacket the polymer optical waveguides. Polymer optical waveguides may be jacketed with a variety of polymeric jacketing materials. Examples of suitable jacketing materials include natural and synthetic rubbers and alpha-mono-olefin polymers and copolymers, such as polyethylene, preferably having low or medium density, polypropylene, and vinyl chloride polymers and co-polymers each containing non-migratory plasticizers.

There are two general types of jacketing processes, pressure type extrusion process and tubing type extrusion process. The most serious problem in jacketing polymer optical waveguides is that many presently available materials used in polymer optical waveguides are heat sensitive at temperatures as low as 80° C. In some extrusion jacketing processes, the extrudable jacketing material is at a temperature well in excess of 130° C. within the extruder. Thus, the jacketing material must not be allowed to remain in prolonged contact with the polymer optical waveguides within the extruder or substantial degradation of the polymer optical waveguide, or its optical transmission properties may occur. In a pressure type extrusion process, the polymer optical waveguide may be subjected to high temperatures and pressures for a sufficient period of time to cause such degradation. In addition, the pressure type extrusion process cannot be used to jacket a multi-strand bundle of filamentary material because the bundle is not round and would fail to seal the outlet of the filament guide within the extruder. The seal failure results in leakage of the extrudable material back into the filament guide.

In a tubing type extrusion process, the major problem faced is that on extrusion of the plastic tube the inner diameter of the plastic tube is larger than the outer diameter of the filamentary material which results in a loose fit. It is important that the filaments be held firmly at each end of the light guide for efficient pick up and display of light. Light guides prepared using a loose jacket require the ends to be specially treated by potting or clamping to immobilize ends. This problem can be partially solved by stretching the tubing while it is being drawn down around the filamentary material, but this creates stresses in the tubing which cannot be relieved on a production line basis due to the low heat tolerance of plastic optical waveguides. Due to these stresses, the tubing or jacket may later shrink when subjected to in-service temperatures thereby leaving the polymer optical waveguide exposed and possibly yielding a kinked waveguide.

Materials described as useful for jacketing polymer optical waveguides are alpha-mono-olefins, for example, polyethylene and polypropylene. See U.S. Pat. No. 3,646,186 (relevant portions incorporated herein). Polyethylene has a relatively low use temperature, however, and may not be suitable for use in polymer optical waveguides which will be exposed to somewhat higher temperatures in service. Other materials, which U.S. Pat. No. 3,646,186 indicates are useful for jacketing of polymer optical waveguides, are the vinyl chloride polymers and co-polymers, for example, polyvinyl chloride. Polyvinyl chloride alone can be very brittle; therefore, plasticizers are required to reduce the brittleness of polyvinyl chloride. Most known plasticizers for polyvinyl chloride are migratory and may migrate into the cladding of the polymer optical waveguide changing the refractive index and therefore, the light transmission properties of the optical waveguide. Non-migratory plasticizers may be used, but such plasticizers are relatively expensive. In addition, polyvinyl chloride has relatively poor solvent resistance. Furthermore, such polymers often lack the rigidity which is desirable for jackets for polymer optical waveguides.

What is needed is a polymer optical waveguide with a jacketing which has a higher use temperature than polyethylene, or a use temperature which matches or exceeds that of the optical waveguide. What is further needed is a polymer optical waveguide with a jacketing material which can be formed about the polymer optical waveguide at temperatures which do not significantly damage or degrade the polymer optical waveguide. What is further desired is a polymer optical waveguide which is jacketed with a material which has good rigidity, low brittleness at use temperatures, and good solvent resistance. What is further needed is a polymer optical waveguide which is jacketed with a material which does not contain additives which will migrate into the polymer optical waveguide and substantially change the optical properties of said polymer optical waveguide.

SUMMARY OF INVENTION

The invention is a jacketed polymer optical fiber which comprises:

A. an optical fiber which comprises a core formed from a light transmitting polymeric material having a first refractive index and a cladding formed from a polymeric material having a second refractive index which is lower than the first refractive index; and B. a jacket about the optical fiber wherein the jacket comprises a chlorinated polyethylene.

The jacketed fibers of this invention have a higher service temperature than polyethylene jacketed fibers. The jacketed polymer optical waveguides of this invention are jacketed under conditions such that the optical properties of the polymer optical waveguide are not substantially degraded. The jacketed polymer optical waveguides have relatively low brittleness at use temperatures, good rigidity, and good solvent resistance. They also contain no materials which tend to migrate into the polymer optical waveguide.

DETAILED DESCRIPTION OF THE INVENTION

The invention relates to polymer optical waveguides jacketed with chlorinated polyethylene or compositions containing chlorinated polyethylene.

The polymer optical waveguides may be any polymer optical waveguides known to those skilled in the art. The jacketed polymer optical waveguides may be round, square, hollow light pipes, n by n arrays of any said shapes, bundles of several polymer optical waveguides, and the like. The material from which the core and clad may be chosen are well known to those skilled in the art.

Those materials used for cores must be capable of transmitting light waves. Such polymers are well known in the art. Suitable polymers include aromatic polyesters, such as polyethylene terephthalate; aromatic polycarbonates; aromatic polyestercarbonates, and blends of aromatic polyestercarbonates with polycarbonates vinyl chloride polymers; polyvinyl alcohols; vinyl aromatic polymers such as polystyrene; aromatic polyimides; polyureas; and polyurethanes. Other materials suitable for cores include polyacrylate based materials, including chlorinated polyacrylates.

Cladding material useful in the polymer optical waveguides of this invention can be any polymer which adheres to the core polymer and has a lower refractive index than the core polymer. The adhesion must be such that during the use or handling of the polymer optical waveguides the cladding does not separate from the core. The polymer used for the cladding must have a lower refractive index so that light passing down the core is reflected or refracted in the direction of the core. The cladding reflects the light back into the core of the polymer optical waveguide so that it may continue down the core. Preferably, the difference in refractive index between the core and the clad is about 0.016 or above. Preferable polymers useful as claddings comprise acrylics, aromatic polyestercarbonates, blends of an aromatic polyestercarbonates with polycarbonates, polycarbonates, imidized acrylic based polymers, or fluoropolymers. Fluoropolymers refer herein to polymers derived from monomers containing unsaturation with fluorine substitution on the unsaturated carbons and acrylics with fluorine substitution on saturated or unsaturated carbons. Preferred fluoropolymers include fluoroolefins and fluorinated acrylics. More preferred fluoropolymer clads include vinylidene fluoride based polymers and co-polymers of vinylidene fluoride with tetrafluoroethylene or hexafluoropropylene. Preferred fluorinated acrylics include fluorinated polyalkyl-acrylates and fluorinated polyalkyl methacrylates. Imidized acrylic based polymers include those described in U.S. Pat. No. 4,246,374.

The jacketing material comprises a chlorinated polyethylene or compositions containing chlorinated polyethylene. Chlorinated polyethylene refers herein to a polyethylene which has been post-chlorinated by processes well known in the art. See *Encyclopedia of Polymer Science and Engineering,* Volume 6, pages 495–497, incorporated herein by reference.

Suitable chlorinated polyethylene materials are prepared by a procedure of the type disclosed in U.S. Pat. No. 3,454,544, the teachings of which are incorporated herein by reference. Satisfactory chlorinated polyethylene resins are readily obtained by practice of a chlorination procedure which comprehends suspension chlorination in an inert medium, of a finely divided, essentially linear polyethylene or olefin interpolymer. The interpolymer contains at least about 90 mole percent ethylene with the remainder being one or more ethylenically unsaturated monomers polymerizable therewith. The polymer is first chlorinated at a temperature below its agglomeration temperature for a period sufficient to provide a partially chlorinated polymer having a chlorine content of from about 2 to 23 percent chlorine, based on the total weight of polymer. This is followed by sequential suspension chlorination of the partially chlorinated polymer, in a particulate form, at a particular temperature. The particular temperature is, with respect to the olefin interpolymer, above its agglomeration temperature but at least about 2° C. below its crystalline melting point. Sequential chlorination is continued for a period sufficient to provide a chemically combined chlorine content of up to about 48 percent by weight of polymer.

Useful ethylenically unsaturated monomers include non-aromatic hydrocarbon olefins having 3 or more carbon atoms such as propylene, butene-1, 1,4-hexadiene, 1,5-hexadiene, octene-1, 1,7-octadiene, 1,9-decadiene and the like; substituted olefins such as acrylic acid, acrylic acid esters and the like; alkenyl aromatic compounds such as styrene and its derivatives, and other known polymerizable materials.

The temperature at which chlorination normally leads to agglomeration of polymer particles depends to a large extent on the nature and molecular weight of the polymer to be chlorinated. In the case of crystalline and predominantly straight chain polyethylenes having a branching of the chains of less than 1 methyl group per 100 carbon atoms and a density of at least 0.94 grams per cubic centimeter, the temperature is above 95° C., in particular above 100° C. or even above about 110° C. In the case of polyethylenes having a relatively marked branching of the chains and a lower density, the temperature is lower, about 65° C.

The temperature employed in the sequential chlorination must be greater than that employed in the initial chlorination in order to prevent (a) retention of excessive undesirable crystallinity, and (b) formation of nonuniformly chlorinated polymer. The temperature employed in the sequential chlorination must also be below the crystalline melting point of the polymer being chlorinated in order to prevent accelerated particle size growth and development of undesirable agglomeration of polymer particles.

After a polyolefinic material has been suspension chlorinated to a desired degree, it may easily be filtered from suspension in the inert suspending liquid and washed and dried to prepare it for subsequent use.

The present invention is not restricted to chlorinated polyethylene resins prepared by suspension of slurry chlorination procedures. See U.S. Pat. No. 4,584,351. Chlorinated polyethylenes useful in this invention include those marketed by The Dow Chemical Company under the trademark TYRIN ® chlorinated polyethylene. Suitable chlorinated polyethylene compositions can be any formulation which gives the desired properties of the jacketing material. Preferably, the chlorinated polyethylene has a high residual crystallinity estimated from heat of fusion. The heat of fusion preferably should be between 8 and 14 cal/g. Preferably, the chlorine content is between 25 and 36 percent.

The jacket composition preferably comprises:
i. a chlorinated polyethylene;
ii. a filler;
iii. a heat stabilizer for the chlorinated polyethylene; and
iv. a lubricant for the the chlorinated polyethylene.

In another embodiment, the chlorinated polyethylene composition further comprises:
v. a polyethylene;
vi. a flame retardant composition;
vii. an anti-oxidant for the chlorinated polyethylene; and
viii. a reinforcing filler.

In an even more preferred embodiment, the chlorinated polyethylene composition further comprises a rubber modified polyolefin.

In the description of the additives to the chlorinated polyethylene formulations hereinafter the amounts of said additives are described in parts per one hundred parts of resin (phr) which means parts of the particular additive per 100 parts of the base resin, herein chlorinated polyethylene.

The flame retardant additive(s) used in the chlorinated polyethylene formulations may be any material which retards the flammability of the jacketing material, and which does not harm either the properties of the jacketing material or the polymer optical waveguides. Flame retardant materials suitable for use in conjunction with chlorinated polyethylene are well known in the art and include antimony oxide, decabromodiphenyloxide, aluminum trihydrates, and chlorinated cyclic aliphatic hydrocarbons. A preferred flame retardant package is a mixture of antimony oxide with decabromodiphenyloxide. Such packages are available from The Dow Chemical Company under the trade name FR 300 BA ® fire retardants, and Satec ® 102E fir retardant available from Ethyl Corporation. The flame retardant composition may be present in any amount sufficient to retard flames in the jacketing composition. Preferably, the flame retardant may be present in amounts of up to 20 phr and more preferably, between about 5 and about 10 phr.

Anti-oxidants useful in the chlorinated polyethylene compositions are materials which prevent the oxidation of the chlorinated polyethylene, and such materials are well known to those skilled in the art. Preferred anti-oxidants include hindered phenols and hindered amines. A preferred anti-oxidant is polymerized 2,2,4-trimethyl-1-2,dihydroquinoline, marketed under the name Agerite ® Resin D anti-oxidant. The anti-oxidant is present in sufficient amounts to prevent the oxidation of the jacketing material. The anti-oxidant is preferably present in between about 0.1 and 1 phr and more preferably, between about 0.5 and 1 phr.

One or more polyethylene resins may be added to the formulation to improve the modulus and the heat distortion of the jacketing material. Polyethylene is added in an amount sufficient to improve the heat distortion and modulus of the jacketing material. The amount is desirably between about 0 and about 30 phr and more preferably, between about 0 and 15 phr. High density polyethylene is preferred.

The compositions may further comprise a reinforcing filler in an amount sufficient to reinforce and improve the tensile properties of the eventually formed jacket. The amount is preferably between about 0 and about 40 phr and more preferably, between about 20 and about 30 phr. Preferred reinforcing fillers include carbon black. Preferred carbon black materials include N-330 and N-550 carbon black.

The compositions may further comprise a non-reinforcing filler in an amount sufficient to improve the melt homogeneity and flow of the composition. Such fillers include calcium carbonate, precipitated silica, and vapor talc. Preferred fillers include vapor talc, with platy talc being the most preferred filler. The amount is preferably between about 0 and about 40 phr, most preferably, between about 30 and about 35 phr.

The chlorinated polyethylene compositions useful in this invention may further comprise heat stabilizers for the chlorinated polyethylene. Preferred heat stabilizers are acid acceptors. Such acceptors include epoxidized soybean oils, cycloaliphatic epoxy compounds, magnesium oxide and metallic carbonates. Barium-sodium complexes and organo phosphates are effective heat stabilizers for chlorinated polyethylene. Other useful heat stabilizers include dibasic lead phthalate, inorganic salts, litharge, barium and cadmium stabilizers. The most preferred heat stabilizer is dibasic lead phthalate. When used, the heat stabilizers are present in sufficient amounts to stabilize the composition to heat, preferably up to 10 phr and more preferably, from about 5 phr to about 10 phr.

A lubricant or process aid for chlorinated polyethylene may be included in the composition to improve the processing of the jacketing material, and give the final product a shinier appearance. Any lubricant or process aid which improves the processing of the compositions of this invention may be used. Preferred lubricants include stearic acid, polyethylene wax, oxidized polyethylene wax and paraffin wax, or combinations thereof. In a preferred mode, the lubricant or processing aid comprises up to one part of stearic acid and up to two parts of a polyethylene wax or paraffin wax.

The composition may further comprise a rubber modified polyolefin. Such rubber modified polyolefin improves the low temperature impact properties of the composition and is preferably present in an amount of up to 15 parts per 100 and more preferably, between about 10 and about 15 phr. One preferred rubber modified polyolefin is an ethylene propylene diene rubber; one such material is marketed under the trade name Epsyn ® E901 available from Copolymer Rubber and Chemical Corp.

A preferred formulation useful as a jacketing material comprises:
i. chlorinated polyethylene;
ii. between about 1 and about 40 parts per hundred parts of resin of a filler;
iii. between about 1 and about 10 parts per hundred parts of resin of a heat stabilizer for the chlorinated polyethylene;
iv. between about 1 and about 3 parts per hundred parts of resin of a lubricant for the chlorinated polyethylene;
v. between about 1 and about 30 parts per hundred parts of resin of a polyethylene;
vi. between about 5 and about 30 parts per hundred parts of resin of a flame retardant composition;
vii. between about 1 and about 20 parts per hundred parts of resin of an anti-oxidant for the chlorinated polyethylene;
viii. between about 1 and about 40 parts per hundred parts of resin of a reinforcing filler; and ix. between about 1 and about 15 parts per hundred parts of resin of a rubber modified polyolefin.

The jacketed fiber may be prepared by processes well known in the art. See Hager, U.S. Pat. No. 3,646,186, (incorporated herein by reference) and Han et al., "Study on Wire Coating Extrusion. 1. The Reology of Wire Coating Extrusion", *Polymer Engineering and Science*, October 1978, Volume 18, No. 13. In particular, the formation of the jacketed fiber is an extrusion process in which either the molten polymer in the form of tubing is extruded continuously over axially moving polymer optical waveguide, or the optical fiber is pulled through the molten polymer in the extruder and thereafter, the coated polymer optical waveguide is extruded. The typical unit for performing this operation consists of a pay off device, an extruder equipped with a crosshead die, a cooling trough and a take up device. The two basic dies used are "pressure type" and "tubing type" dies. In the pressure type die, the molten plastic is under pressure when it contacts the polymer optical waveguide inside the die. In the tubing-type die, the extruded molten plastic tube contacts the polymer optical waveguide outside the die and is drawn around the polymer optical waveguide by the motion of said waveguide. The tubing-type dies are annular in cross section. The geometry outside the tubing is important from the point of view of obtaining coatings with better mechanical and electrical properties and surface smoothness. The pressure type die is an annulus, the inside surface of which is the polymer optical waveguide to be coated, moving at constant velocity. The flow through this type of die is analogous to a flow through an annulus formed by coaxial cylinders with the inner cylinder, moving in the axial direction. It is preferred to prepare the jacketed polymer optical waveguides by using a "pressure type" die.

In the process for formation, the polymer optical waveguide is paid off and passed into the crosshead die via a fiber guide. Inside of the crosshead die the waveguide is contacted with molten chlorinated polyethylene or a formulation thereof. The fiber with the molten chlorinated polyethylene is extruded through an orifice in the die under conditions such that the fiber is coated with the chlorinated polyethylene composition. Shortly after leaving the die, it is desirable to pass the jacketed polymer optical waveguide through a cooling trough. Generally, this cooling is effected by passing the jacketed polymer optical waveguide through a trough containing a heat transfer liquid. A preferred heat transfer liquid is water. After cooling or quenching the fiber and jacketing, the jacketed polymer optical waveguide is taken up. The unjacketed fiber must be fed to the crosshead die in a manner which will keep a small amount of tension on the fiber so that the fiber unwinds smoothly from the reel but not so much tension that the fiber is stretched in the die. The jacketing compound is fed to the crosshead die at the maximum rate possible at the jacketing temperature. The maximum rate is dictated by the extruder pressure. Preferably, the jacketing material is fed at a rate of between about 3 and 80 pounds per hour (1.36 and 36.3 kilograms per hour), more preferably between about 20 and about 40 pounds per hour (9.7 and 18.1 kilograms per hour). The optimum speed and temperature must be determined for each waveguide jacketing situation. Preferably, extrusion temperatures are between about 100° and about 200° C., more preferably between about 120° and about 160° C. Preferably, the distance between the orifice of the crosshead die and the entrance of a polymer optical waveguide into the quench medium is as short as possible. Such distance can be a matter of a few inches. The temperature of the cooling medium is preferably between about 0° and 30° C., more preferably between about 5° and about 15° C. The residence time in the cooling bath is preferably between about 1 and 90 seconds, more preferably between about 2 and 10 seconds. The crosshead die can be adjusted to apply the jacketing material either loosely or tightly. Some adhesion to the polymer optical waveguide is desirable. However, too much adhesion can make the jacketing difficult to strip when making connection to the fiber. The adjustment in the die, which lowers the adhesion, also increases the extrusion pressure of the cladding material. Thus, the desired jacketing adhesion must be balanced against the desired line speed.

In some embodiments it may be useful to place a buffer layer between the polymer optical waveguide and the jacket. This buffer functions to facilitate stripping a portion of the jacket from a portion of the waveguide to facilitate making connections with the waveguide. The buffer layer may comprise any material which does not have strong adherence to the waveguide or jacketing material. Preferred materials useful as a buffer material includes elastomeric materials, preferred elastomeric materials include polyurethanes and polysiloxanes. The buffer layer may be extruded onto the waveguide prior to jacketing or the buffer layer and jacketing may be co-extruded onto the waveguide simultaneously. Methods for such extrusion and co-extrusion are well known in the art.

EXAMPLES

The following examples are included for illustrative purposes only. Unless otherwise stated, all parts and percentages are by weight.

Examples 1-3

The following formulation is used to jacket three different polymer optical waveguides.

TABLE I

| Ingredients | PHR |
|---|---|
| TYRIN ®[1] CM 674 Chlorinated[2] Polyethylene | 100.0 |
| Dow 30060M[1] High Density Polyethylene | 12.5 |
| FR300BS[1] Decabromodiphenyl oxide flame retardant additive | 15.1 |
| AC 629A[3] Wax Polyethylene Wax | 1.5 |
| Agerite ®[4] Resin D Polymerized 2,2,4-trimethyl-1,2-dihydroquinoline | 0.5 |
| Antimony Oxide $Sb_2O_3$ | 5 |
| Carbon Black (N-330) Fast Extruding Furnace Black | 20 |
| Dythal ®[5] XL Dibasic Lead Phthalate | 6 |
| EPsyn ®[6] E-901 Ethylene Propylene Diene Terpolymer | 12.5 |
| Mistron ®[7] Vapor Talc Magnesium Silicate | 35 |
| Stearic Acid N—Octadecanoic Acid | 0.8 |
| TOTAL | 208.9 |

[1]Available from The Dow Chemical Company.
[2]Chlorine content 25 weight percent and heat of fusion 11 ± 3 cal/g.
[3]Available from Allied Chemical Co.
[4]Available from R. T. Vanderbilt Co.
[5]Available from Associated Lead Co.
[6]Available from Copolymer Rubber & Chemical Corp.
[7]Available from Cyprus Co.

The jacketing process conditions are listed in Table II.

TABLE II

| Example | Optical Fiber | Diameter mm | rpm | Pressure psig | Line Speed ft/min | Gatto Puller Setting |
|---|---|---|---|---|---|---|
| 1 | Crofon[1] Optical Fiber | 1.0 | 25 | 3150 | 23 | 5.6 |
| 2 | Eska[2] Optical Fiber | .75 | 25 | 3400 | 21.4 | 5.4 |
| 3 | Eska[2] Optical Fiber 0.5 mm diameter (0.020 in.) | 0.5 | 25 | 3400 | 20.7 | 5.2 |

[1]Trademark of E. I. duPont de Nemours & Co.
[2]Trademark of Mitsubishi Rayon

The extruder used is an MPM one-inch diameter, non-vented barrel, 24 to 1 l/d. The screw is a metering type with a feed depth of 0.188 inches, 5 metering flights of 0.063 inch depth with a 3 to 1 compression ratio. The crosshead die is a B&H 30, 9/32×⅝ inch. The die 1 has an inside diameter of 0.121 inches and the tip 1 has an outside diameter of 0.041 inches. Die 2 has an inside diameter of 0.088 inches with a tip outside diameter of 0.045 inches. There is zero land length on all tips and dies. The take off is a Gatto pipe puller with a Capacitron variable tension take up real. The tip O.D. to die O.D. is 0.041 to 0.121, the temperature profile in the extruder is zone 1 300° F., zone 2 320° F., and die 320° F. The tip I.D. in the polymer optical waveguide jacketing run is 0.045 with the die I.D. of 0.088. The finished cable has an outside diameter of 0.087 inches. The rpm's on the extruder, the extruder pressure, line speed, and Gatto puller setting are indicated for each fiber.

Examples 4–7

Several optical waveguides are jacketed using various conditions. The waveguides jacketed comprise a polystyrene core with a methylmethacrylate cladding. The jacketing material used is composed of the following components are listed in Table III.

TABLE III

| Ingredients | PHR |
|---|---|
| TYRIN[1] CM 2552 Chlorinated[2] Polyethylene | 100.0 |
| Dow 30060M[1] High Density Polyethylene | 30.0 |
| FR300BS[1] Decabromodiphenyl oxide flame retardant additive | 12.5 |
| AC 629A[3] Wax Polyethylene Wax | 2.0 |
| Agerite[4] Resin D Polymerized 2,2,4-trimethyl-1,2-dihydroquinoline | 0.5 |
| Antimony Oxide Sb₂O₃ | 10 |
| Carbon Black (N-550) Fast Extruding Furnace Black | 35 |
| Dythal XL[6] Dibasic Lead Phthalate | 6 |
| Stearic Acid N—Octadecanoic Acid | 0.8 |
| TOTAL | 196.8 |

[1]Available from The Dow Chemical Company.
[2]Heat of fusion 11 ± 3 cal/g, chlorine content 25 weight percent.
[3]Available from Allied Chemical Co.
[4]Available from R. T. Vanderbilt Co.
[5]Available from Associated Lead Co.
[6]Available from Copolymer Rubber & Chemical Corp.

The extruder used is a Killion one-inch diameter, non-vented barrel, 30 to 1 l/d. The screw is a metering type with 10 feed flights 0.194 inch deep, 10 transition flights, and 10 metering flights 0.063 inch deep. The crosshead die is a B&H Tool Company No. 40. The die used for jacketing 0.75 mm fiber has an inside diameter of 0.0925 inches and no land. Tip 1 has an inside diameter of 0.033 inches and no land. Die 2 used for jacketing 1.0 mm has an inside diameter of 0.150 inches and a land of 0.150 inches. Tip 2 has an inside diameter of 0.043 inches and no land. The finished cable has an outside diameter of 2.2 mm (0.087 inches). The fiber is fed to the crosshead die by a Norrsken PF-01 fiber pay-off with variable tension brake. The jacketed fiber is cooled in a Killion constant temperature (10° C.) water bath, 10 feet long, and pulled by a Killion tractor puller.

The jacketing conditions are compiled in Table IV.

TABLE IV

| Example | Fiber Diameter mm | Melt Temp. °C. | Die Temp. °C. | Pressure psig | Extruder Screw-speed, rpm | Line-speed ft/min |
|---|---|---|---|---|---|---|
| 4 | 0.75 | 143 | 135 | 4200 | 25 | 34 |
| 5 | 0.75 | 141 | 150 | 4200 | 17 | 25 |
| 6 | 0.75 | 143 | 140 | 4300 | 34 | 41 |
| 7 | 1.0 | 136 | 130 | 2800 | 25 | 20 |
| 8 | 1.0 | 138 | 125 | 3000 | 43 | 59 |
| 9 | 1.0 | 141 | 125 | 3000 | 55 | 71 |

What is claimed is:
1. A jacketed polymer optical fiber which comprises:
   A. a polymer optical waveguide which comprises a core formed from a light transmitting polymeric material having a first refractive index and a cladding formed from a polymeric material having a second refractive index which is lower than the first refractive index; and
   B. a jacket about the polymer optical waveguide wherein the jacket comprises:
      i. a chlorinated polyethylene;
      ii. a filler;
      iii. a heat stabilizer for the chlorinated polyethylene; and
      iv. a lubricant for the the chlorinated polyethylene.
2. A jacketed polymer optical waveguide of claim 1 wherein the chlorinated polyethylene has a heat of fusion of between about 8 and 14 cal/g.
3. A jacketed polymer optical waveguide of claim 2 wherein the jacket further comprises:
   v. a polyethylene;
   vi. a flame retardant composition;
   vii. an anti-oxidant for the chlorinated polyethylene; and
   viii. a reinforcing filler.
4. A jacketed polymer optical waveguide of claim 3 wherein the jacket further comprises:
   ix. a rubber modified polyolefin.
5. A jacketed polymer optical waveguide of claim 4 wherein the jacket comprises:
   i. chlorinated polyethylene;
   ii. between about 1 and about 40 parts per hundred parts of resin of a filler;
   iii. between about 1 and about 10 parts per hundred parts of resin of a heat stabilizer for the chlorinated polyethylene;
   iv. between about 1 and about 3 parts per hundred parts of resin of a lubricant for the chlorinated polyethylene;

v. between about 1 and about 30 parts per hundred parts of resin of a polyethylene;
vi. between about 5 and about 30 parts per hundred parts of resin of a flame retardant composition;
vii. between about 1 and about 20 parts per hundred parts of resin of an anti-oxidant for the chlorinated polyethylene;
viii. between about 1 and about 40 parts per hundred parts of resin of a reinforcing filler; and
ix. between about 1 and about 15 parts per hundred parts of resin of a rubber modified polyolefin.

6. A jacketed polymer optical waveguide of claim 5 wherein:
  i. the filler comprises a platy talc;
  ii. the heat stabilizer comprises dibasic lead phthalate;
  iii. the lubricant comprises stearic acid and a polyethylene or paraffin wax;
  iv. the polyethylene comprises a high density polyethylene;
  v. the flame retardant composition comprises antimony oxide and decabromo diphenyl oxide;
  vi. the anti-oxidant comprises polymerized 2,2,4-trimethyl-1,2-dihydroquinoline;
  vii. the reinforcing filler comprises carbon black; and
  viii. the rubber modified polyolefin comprises an ethylene propylene diene rubber.

7. The jacketed polymer optical waveguide of claim 4 wherein a buffer layer of an elastomeric material is located between the polymer optical waveguide and the jacket.

* * * * *